(12) United States Patent
Fracchia et al.

(10) Patent No.: US 11,254,216 B2
(45) Date of Patent: Feb. 22, 2022

(54) CONTROL SYSTEM AND METHOD FOR CONTROLLING A TORQUE GENERATOR

(71) Applicant: Jaguar Land Rover Limited, Coventry (GB)

(72) Inventors: Riccardo Fracchia, Coventry (GB); Orrin Hipkin, Coventry (GB)

(73) Assignee: JAGUAR LAND ROVER LIMITED, Whitley Coventry (GB)

(*) Notice: Subject to any disclaimer, the term of this patent is extended or adjusted under 35 U.S.C. 154(b) by 186 days.

(21) Appl. No.: 16/243,719

(22) Filed: Jan. 9, 2019

(65) Prior Publication Data

US 2019/0263268 A1 Aug. 29, 2019

(30) Foreign Application Priority Data

Feb. 23, 2018 (GB) .................................. 1802944

(51) Int. Cl.
*B60L 7/18* (2006.01)
*B60L 15/20* (2006.01)
(Continued)

(52) U.S. Cl.
CPC ............. *B60L 7/18* (2013.01); *B60L 15/2009* (2013.01); *B60T 1/10* (2013.01); *B60T 8/1761* (2013.01);
(Continued)

(58) Field of Classification Search
CPC ...... B60T 8/1761; B60T 2210/14; B60T 1/10; B60T 2270/60; B60L 2240/642; B60L 2240/647; B60L 2240/645; F16D 61/00
See application file for complete search history.

(56) References Cited

U.S. PATENT DOCUMENTS

| 2014/0257664 A1* | 9/2014 | Arbitmann ................ B60L 7/26 701/71 |
| 2015/0298553 A1* | 10/2015 | Maiterth ................... B60L 7/22 701/71 |

(Continued)

FOREIGN PATENT DOCUMENTS

| DE | 102004040357 A1 | 2/2006 |
| DE | 102010004846 A1 | 3/2011 |

(Continued)

OTHER PUBLICATIONS

Patents Act 1977: Combined Search and Examination Report under Sections 17 and 18(3), UKIPO Application No. 1802944.7, Aug. 9, 2018, 6 pp.

(Continued)

*Primary Examiner* — Alan D Hutchinson
*Assistant Examiner* — Andy Schneider
(74) *Attorney, Agent, or Firm* — Reising Ethington P.C.

(57) ABSTRACT

The invention relates to a control system for controlling a torque generator of a vehicle. The control system is configured to receive one or more electrical signals indicative of a surface indicator; receive one or more electrical signals indicative of a deceleration demand; select a surface type from a plurality of predetermined surface types based on said one or more electrical signals indicative of a surface indicator; determine a target vehicle deceleration in dependence on the selected surface type; determine, based on said one or more electrical signals indicative of a deceleration demand, a requirement to decelerate the vehicle; and in dependence on determining said requirement, output a control signal to the torque generator. The control signal is configured to cause the torque generator to provide the target vehicle deceleration.

18 Claims, 4 Drawing Sheets

(51) Int. Cl.
*B60T 8/1761* (2006.01)
*B60T 13/58* (2006.01)
*B60T 1/10* (2006.01)
*F16D 61/00* (2006.01)

(52) U.S. Cl.
CPC ............ *B60T 13/586* (2013.01); *F16D 61/00* (2013.01); *B60L 2240/12* (2013.01); *B60L 2240/16* (2013.01); *B60L 2240/18* (2013.01); *B60L 2240/24* (2013.01); *B60L 2240/642* (2013.01); *B60L 2240/647* (2013.01); *B60L 2240/662* (2013.01); *B60T 2210/12* (2013.01); *B60T 2210/14* (2013.01); *B60T 2270/60* (2013.01); *B60T 2270/604* (2013.01)

(56) References Cited

U.S. PATENT DOCUMENTS

| | | | |
|---|---|---|---|
| 2016/0244057 A1* | 8/2016 | Kelly | B60W 30/143 |
| 2017/0072926 A1 | 3/2017 | Fukuda et al. | |
| 2018/0222460 A1* | 8/2018 | Owen | B60W 30/18109 |

FOREIGN PATENT DOCUMENTS

| | | |
|---|---|---|
| DE | 102014207068 A1 | 10/2015 |
| GB | 2505028 A | 2/2014 |

OTHER PUBLICATIONS

German Search Report with machine translation corresponding to German Application No. 10 2019 201 765.7, dated Aug. 14, 2021, 16 pages.

* cited by examiner

CONTROL SYSTEM AND METHOD FOR CONTROLLING A TORQUE GENERATOR

CROSS-REFERENCE TO RELATED APPLICATION

This application claims priority under 35 U.S.C. § 119 to Great Britain Application No. 1802944.7, filed Feb. 23, 2018, the content of which is incorporated herein by reference in its entirety.

TECHNICAL FIELD

The present disclosure relates to a control system and particularly, but not exclusively, to a control system for controlling a torque generator of a vehicle. Aspects of the invention relate to a control system, to a controller, to a vehicle and to a control method.

BACKGROUND

Engine braking has traditionally been used in the absence of an acceleration demand to generate negative torque and decelerate a vehicle in a stable manner. However, engine braking is not available in an electric vehicle due to the lack of an internal combustion engine (ICE). This is thought to have a negative impact on the drivability of some electric vehicles.

To address this problem, modern electric vehicles include electric motors that are configured to produce negative torque when there is no acceleration demand. The negative torque can be varied according to a deceleration demand and, in some vehicles, the kinetic energy of the vehicle can be converted into electrical energy as the vehicle decelerates. In this configuration, the electric motors act as generators and the electrical energy can be stored for subsequent reuse, which improves the range and operating efficiency of the vehicle. This form of deceleration is known as regenerative braking, which may be used to replicate the engine braking effect produced by an internal combustion engine.

However, in certain driving conditions, the deceleration can be excessive or undesirable. For example, excessive deceleration on a slippery surface can cause a loss of traction, whilst braking on a high drag surface may be uncomfortably harsh and may cause the wheels of the vehicle to pitch into the surface of a soft terrain, like sand.

The present invention has been devised to mitigate or overcome at least some of the above-mentioned problems.

SUMMARY OF THE INVENTION

Aspects of the invention relate to a control system, to a controller, to a vehicle, to a control method, to a computer program and to a non-transitory computer readable medium as claimed in the appended claims.

According to an aspect of the present invention there is provided a control system for controlling a torque generator of a vehicle, the control system being configured to: receive one or more electrical signals indicative of a surface indicator; receive one or more electrical signals indicative of a deceleration demand; select a surface type from a plurality of predetermined surface types based on said one or more electrical signals indicative of a surface indicator; determine a target vehicle deceleration in dependence on the selected surface type; determine, based on said one or more electrical signals indicative of a deceleration demand, a requirement to decelerate the vehicle; and in dependence on determining said requirement, output a control signal to the torque generator, wherein the control signal is configured to cause the torque generator to provide the target vehicle deceleration.

In essence, the invention may control the deceleration of a vehicle based on a classification of the terrain or surface on which the vehicle is driving or will be driving on. For example, the control system may determine a gentle deceleration on a gravel surface type in order to preserve the stability of the vehicle, but determine a deceleration that is much harsher on a regular tarmac surface type.

Advantageously, the control system may determine a target vehicle deceleration that provides comparable deceleration to engine braking whilst ensuring that the deceleration is not excessive in respect of the terrain or surface on which the vehicle is travelling, i.e. ensuring that the deceleration does not exceed stability limits.

The vehicle may, for example, take the form of a hybrid vehicle in which a proportion of the vehicle deceleration is provided by the ICE (in the form of engine braking) and another proportion is provided by an electric machine acting as a generator (regenerative braking).

The torque generator may take the form of any device or means capable of producing torque that decelerates the vehicle. For example, the torque generator may comprise a drive torque generator, such as an electric machine or an engine. Advantageously, drive torque generator may be operable to provide enhanced control of the deceleration of the vehicle compared to a brake means.

The drive torque generator may, for example, be an electric motor and the control signal to the torque generator may cause the drive torque generator to provide a regenerative braking torque.

Optionally, the torque generator may include a vehicle brake. The vehicle brake may take various forms including, but not limited to, a friction brake or a foundation brake. The control system may, for example, operate the vehicle brake if the target vehicle deceleration exceeds the deceleration capabilities of the drive torque sources of the vehicle.

The surface indicators may include information relating to one or more characteristics of the surface or information that can be used to identify the surface type.

The plurality of predetermined surface types may, for example, include grassy, gravel, snowy, rocky, muddy, rutted, sandy and regular tarmac surface types.

Optionally, the control system may select the surface type from the plurality of predetermined surface types based on a plurality of surface indicators. Advantageously, a plurality of surface indicators may make a surface type (e.g. a grass surface or a muddy surface) more or less likely when combined together, compared with basing the selection on just a single surface indicator alone.

The deceleration demand may be an overrun demand. For example, the deceleration demand may arise when the driver lifts-off and at least partially releases an accelerator pedal. In this manner, the target vehicle deceleration may replicate the feel of engine braking. The deceleration demand may, for example, arise when the travel of the accelerator pedal is less than a threshold travel position. In an embodiment, the deceleration demand may be generated by an advanced driver aid system, such as a collision avoidance system.

The control signal may, for example, cause the torque generator to produce a negative torque that acts to decelerate the vehicle and produce the target vehicle deceleration. The negative torque may include a regenerative braking torque, which converts the kinetic energy of the vehicle into electrical energy.

Optionally, the control system comprises one or more controllers, individually or collectively, comprising: means for receiving said one or more electrical signals indicative of a surface indicator; means for receiving said one or more electrical signals indicative of a deceleration demand; means for selecting the surface type; means for determining the target vehicle deceleration; means for determining the requirement to decelerate the vehicle; and means for, in dependence on determining said requirement, outputting the control signal to the torque generator.

Additionally, the means for selecting the surface type may, for example, comprise an electronic processor and an electronic memory device electrically coupled to the electronic processor and having instructions stored therein. The means for determining the target vehicle deceleration may comprise an electronic processor and an electronic memory device electrically coupled to the electronic processor and having instructions stored therein. The means for determining the requirement to decelerate the vehicle may comprise an electronic processor and an electronic memory device electrically coupled to the electronic processor and having instructions stored therein. The means for selecting the surface type may, for example, comprise the processor being configured to access the memory device and execute the instructions stored therein such that it is operable to select the surface type. The means for determining the target vehicle deceleration may comprise the processor being configured to access the memory device and execute the instructions stored therein such that it is operable to determine the target vehicle deceleration. The means for determining the requirement to decelerate the vehicle may comprise the processor being configured to access the memory device and execute the instructions stored therein such that it is operable to determine the requirement to decelerate the vehicle and generate the control signal.

In an embodiment, said one or more electrical signals indicative of a surface indicator are indicative of the type of surface on which the vehicle is travelling or will be travelling on.

Optionally, one or more of said electrical signals indicative of a surface indicator may be generated by a user input. The user input may take the form of a surface type selection. For example, the vehicle may include a Human-machine interface device configured to receive a user input in the form of a surface type selection and to communicate the user input to the control system. The Human-machine interface device may be configured to display each of the predetermined surface types and to receive the surface type selection from the user. Advantageously, the user input may be used to configure the control system to account for a surface type that has not been selected. For example, the driver may select a grassy surface type before steering the vehicle off-road.

Optionally, said one or more electrical signals indicative of a surface indicator comprise information relating to at least one of: a coefficient of friction; a surface drag; a terrain roughness; wheel slip; a longitudinal acceleration; a lateral acceleration; a steering input; and an ambient temperature. The coefficient of friction may be a coefficient of friction between one or more wheels of the vehicle and the surface on which the vehicle is travelling.

In an embodiment, the control system may be configured to select the surface type by comparing the information with a corresponding condition associated with each predetermined surface type. In an embodiment, the control system may be configured to select the surface type by comparing the information with a plurality of corresponding conditions associated with each predetermined surface type. The conditions for each predetermined surface type may include boundary values for each surface indicator associated with said surface type. The control system may, for example, include a look-up table comprising each of the predetermined surface types and a plurality of conditions that are associated with each surface type. In this manner, multiple surface indicators may be compared to corresponding conditions to determine the most suitable surface type from the plurality of predetermined surface types.

The control system may, for example, be configured to receive at least one further electrical signal indicative of at least one of: a vehicle speed; a user preference; a coefficient of friction; a surface drag; and a gradient of the surface; wherein the control system is configured to determine the target deceleration based on said at least one further electrical signal. In this manner, the further signal may comprise information relating to the motion and status of the vehicle. The control system may use the further signal to refine the target vehicle deceleration.

Optionally, the control system may be configured to determine the target deceleration based on a predetermined deceleration associated with the selected surface type. Advantageously, the predetermined deceleration may, for example, be predetermined to provide suitable deceleration for said surface type that maintains the traction and stability of the vehicle.

In an embodiment, the predetermined deceleration may be included on a data map. For example, a tuneable data map that provides a relationship between the target vehicle deceleration and one or more of the surface indicators and/or the information relating to the motion and status of the vehicle. For example, the data map may provide a relationship between the selected surface type, the target vehicle deceleration and one or more of the vehicle speed, the gradient of the surface, the coefficient of friction or the surface drag.

The control system may, for example, be configured to determine the target vehicle deceleration prior to determining the requirement to decelerate the vehicle. In this manner, the control system may be able to prevent wheel slip and/or loss of traction in the event of a deceleration demand.

According to another aspect of the invention there is provided a method of controlling a torque generator of a vehicle, the method comprising: receiving one or more electrical signals indicative of a surface indicator; selecting a surface type from a plurality of predetermined surface types based on said one or more electrical signals indicative of a surface indicator; determining a target deceleration based on the selected surface type; receiving one or more electrical signal indicative of a deceleration demand; determining, based on said one or more electrical signals indicative of a deceleration demand, a requirement to decelerate the vehicle; and outputting a torque control signal to the torque generator in dependence on determining the requirement to decelerate the vehicle, wherein the torque control signal is configured to cause the torque generator to generate the target deceleration.

According to another aspect of the invention there is provided a computer program that, when run on at least one electronic processor, causes the method described in a previous aspect of the invention to be performed.

According to a further aspect of the invention there is provided a non-transitory computer readable medium comprising computer readable instructions that, when executed by a processor, cause performance of the method described in a previous aspect of the invention.

According to a still further aspect of the invention there is provided a controller for controlling a torque generator of a vehicle, the controller including: means for receiving one or more electrical signals indicative of a surface indicator; means for receiving one or more electrical signals indicative of a deceleration demand; means for selecting a surface type, from a plurality of predetermined surface types, based on said one or more electrical signals indicative of a surface indicator; means for determining a target vehicle deceleration in dependence on the selected surface type; means for determining, based on said one or more electrical signals indicative of a deceleration demand, a requirement to decelerate the vehicle; and means for, in dependence on determining said requirement, outputting the control signal to the torque generator.

According to yet another aspect of the invention there is provided a vehicle comprising the control system described in a previous aspect of the invention or the controller described in another previous aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of the invention relate to a control system for controlling the deceleration of a hybrid or an electric vehicle when there is no acceleration demand. More specifically, embodiments of the invention relate to a control system for controlling the amount of regenerative braking torque developed during an overrun or freewheel demand, so as to optimise the deceleration of the vehicle in respect of the terrain on which the vehicle is travelling.

The control system is configured to identify a surface on which the vehicle is travelling and to configure the electric motors and/or brakes to decelerate the vehicle at a suitable rate upon demand. The rate of deceleration should be sufficient to satisfy user expectations, whilst maintaining vehicle stability. The ideal deceleration rate is predetermined based on the type of surface, but it may be further refined based on other factors including vehicle speed, the gradient of the surface and one or more user preferences.

Figure 1:
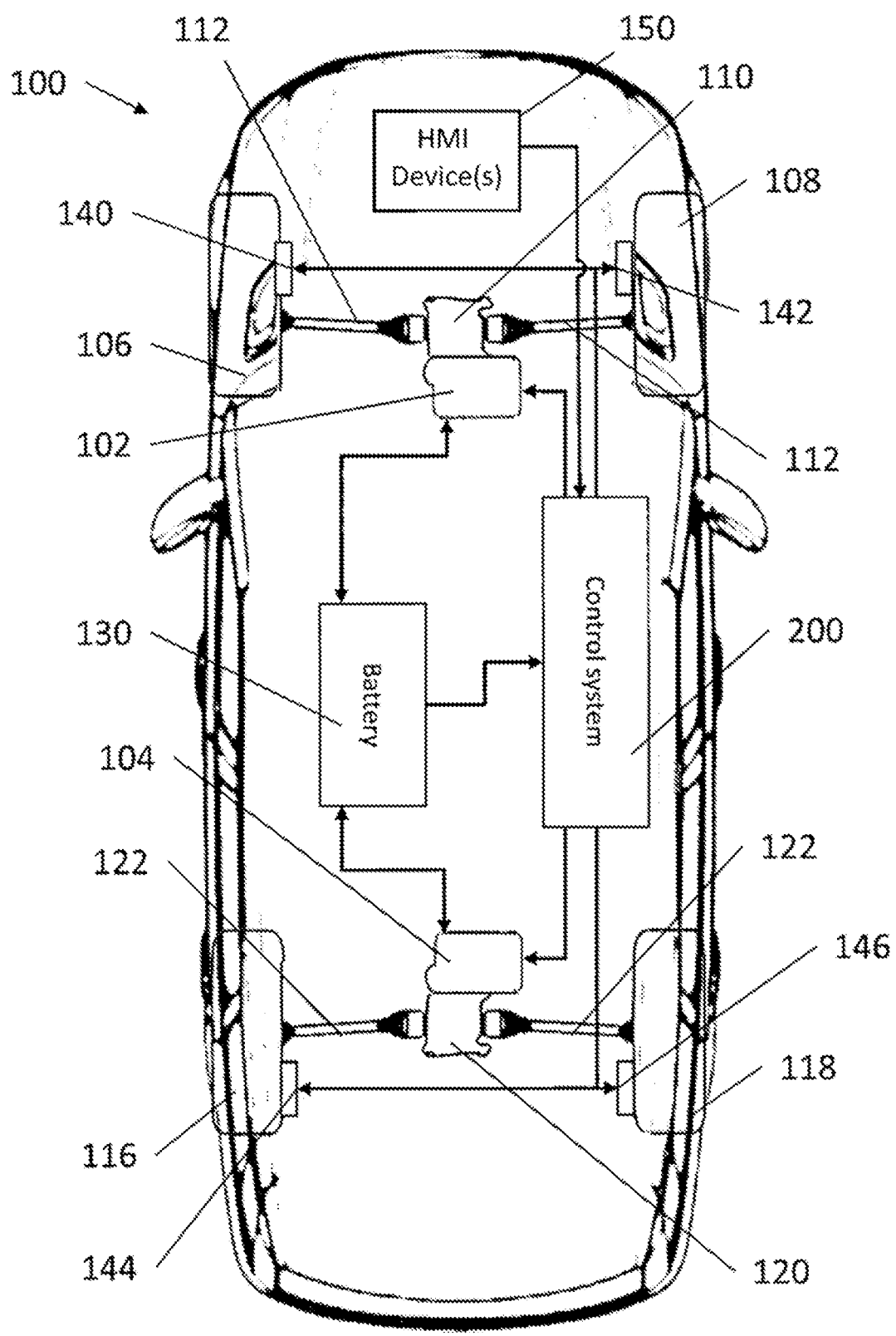
FIG. 1 illustrates an embodiment of a vehicle in accordance with the present invention.

FIG. 1 shows a vehicle 100 according to an embodiment of the invention. Embodiments of the present invention are suitable for use in battery electric vehicle (BEVs), hybrid electric vehicle (HEVs) and mild-hybrid electric vehicle (MHEVs).

The vehicle 100 includes a plurality of torque generating means, in the form of torque generators, configured to control the speed of the vehicle 100. The torque generators include drive torque sources that accelerate or decelerate the vehicle 100 in a forward or a rearward direction of travel and brakes that resist wheel rotation and decelerate the vehicle 100. The drive torque sources take the form of a first electric motor 102 and a second electric motor 104. The first electric motor 102 is arranged to drive a pair of front vehicle wheels 106, 108 by means of a front differential 110 and a pair of front driveshafts 112. The second electric motor 104 is arranged to drive a pair of rear wheels 116, 118 by means of a rear differential 120 and a pair of rear driveshafts 122.

Embodiments of the invention are suitable for use with vehicles in which a pair of front wheels or a pair of rear wheels are driven by the drive torque sources (i.e. front wheel drive vehicle or rear wheel drive vehicles), as well as selectable two wheel drive/four wheel drive vehicles.

The first and second electric motors 102, 104 are electrically connected to a battery 130 and are configured to draw electrical power from the battery 130 in order to generate positive torque that accelerates the vehicle 100 in the forward or rearward directions. Advantageously, upon demand, the first and second electric motors 102, 104 are also operable to generate negative torque that resists rotation of the wheels, which can be used to decelerate the vehicle 100.

For the sake of clarity, by 'positive torque' it is intended to mean torque that acts to accelerate the vehicle 100 in the direction of travel. By 'negative torque' it is intended to mean torque that acts to decelerate or reduce the vehicle speed in the direction of travel.

The first and second electric motors 102, 104 can be controlled to provide at least some of the negative torque as regenerative braking torque, which converts the kinetic energy of the vehicle 100 into electrical energy. In this manner, the first and second electric motors 102, 104 are operable as generators whilst decelerating the vehicle 100 and the electrical energy can be transferred to the battery 130 and stored for subsequent reuse.

The plurality of brakes includes a first brake 140, a second brake 142, a third brake 144 and a fourth brake 146 coupled to respective wheels 106, 108, 116, 118 of the vehicle 100 and configured to generate additional negative torque to decelerate the vehicle 100. For example, the brakes 140, 142, 144, 146 may be used when the required deceleration exceeds the negative torque capable of being delivered by the electric motors 102, 104. The brakes 140, 142, 144, 146 may take any form that is suitable to decelerate the vehicle and may also include one or more regenerative braking devices. In this manner, the brakes 140, 142, 144, 146 may also be configured to contribute regenerative braking torque and convert the kinetic energy of the vehicle 100 into electrical energy.

The vehicle 100 has an accelerator pedal (not shown), a brake pedal (not shown) and a steering wheel (not shown) for receiving control inputs from a driver. The control inputs include a positive torque demand, or acceleration demand, that is generated when the accelerator pedal is depressed, for example depressed past a threshold travel position. The deceleration demand may arise when there is no positive torque demand, i.e. when there is a freewheel or overrun demand in which the driver lifts-off and at least partially releases the accelerator pedal. In this condition, the travel of the accelerator pedal is less than the threshold travel position.

When there is no positive torque demand, the vehicle 100 is configured to produce negative torque and decelerate in a manner that may be comparable to engine braking on a conventional ICE vehicle. Hence, the vehicle 100 is configured to reduce speed whilst there is no positive torque demand.

The vehicle 100 is intended to be suitable for off-road use, i.e. suitable for, but not limited to, use on terrains other than regular tarmac road. More specifically, the vehicle 100 is configured to determine characteristics of the terrain or surface on which the vehicle 100 is travelling, classify the surface type and, upon demand, decelerate the vehicle 100 in a stable manner.

Accordingly, the vehicle 100 includes one or more sensors, subsystems and Human-Machine Interface (HMI) devices 150 configured to monitor the terrain and the motion and status of the vehicle 100.

The sensors on the vehicle 100 include, but are not limited to, sensors that provide continuous sensor outputs, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral and vertical motion sensors.

The sensors also include, but are not limited to, sensors that provide discrete outputs relating to the operation of other vehicle subsystems. The discrete outputs may include a cruise control status signal (ON/OFF), a Hill Descent Control (HDC) status signal (ON/OFF), a trailer connect status signal (ON/OFF), a signal to indicate that a Stability Control system (SCS) has been activated (ON/OFF), a windscreen wiper signal (ON/OFF), an air suspension ride-height status signal (HI/LO), and a Dynamic Stability Control (DSC) signal (ON/OFF).

The implementation of such sensory systems in a terrain response system is known in the art and will be familiar to the skilled reader.

The subsystems on the vehicle 100 may, for example, include a cruise control system, a trailer monitoring system, a Stability Control System (SCS), a suspension system, a brake system, an electric powertrain control system and a Dynamic Stability Control (DSC) system.

The HMI devices on the vehicle 100 are configured to receive one or more inputs from a user; to process the user inputs and to output one or more signals comprising a surface type selection and/or a preferred deceleration harshness.

In other embodiments, only a selection of the aforementioned sensors, subsystems or HMI devices 150 may be used.

Figure 2:
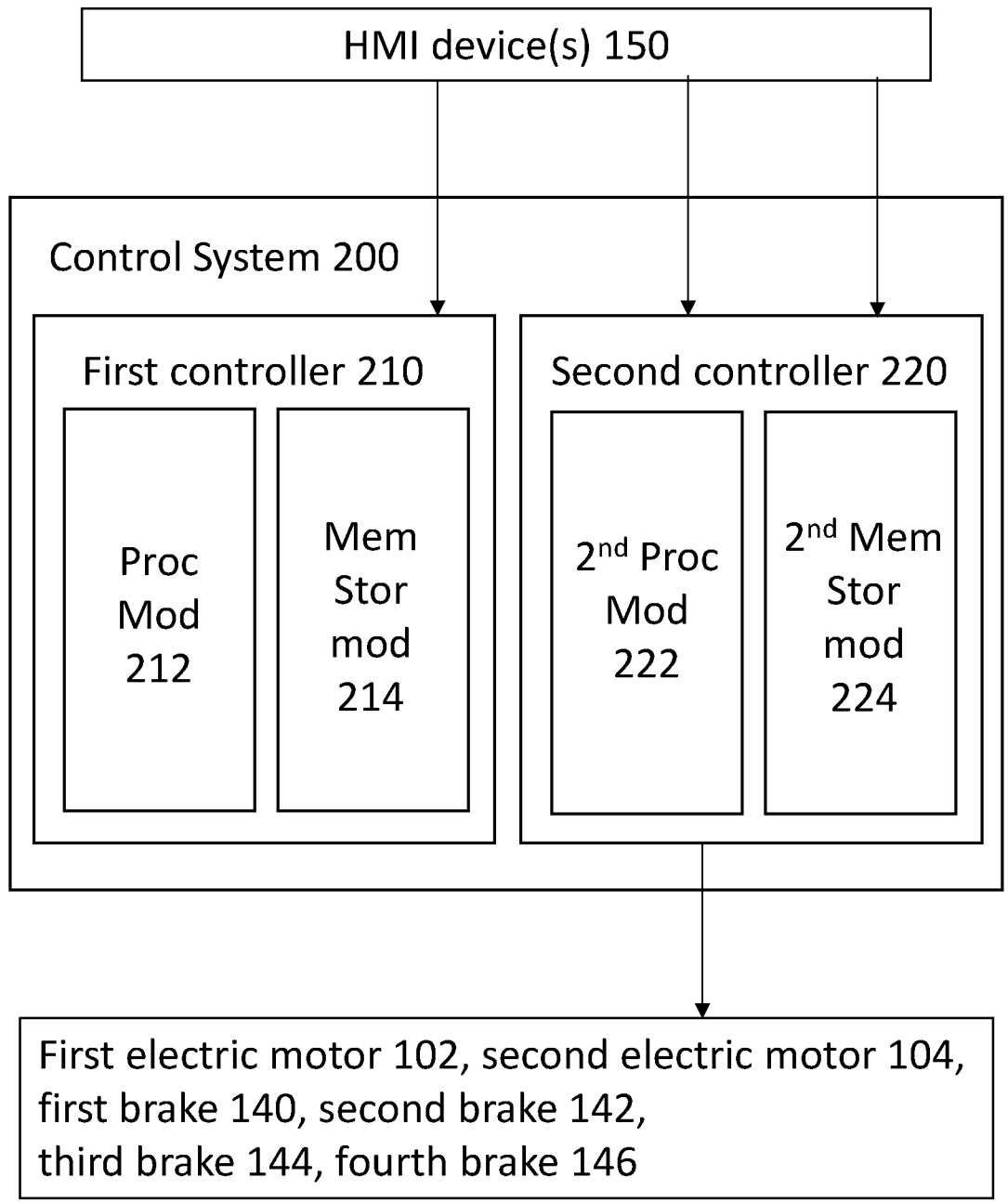
FIG. 2 illustrates an embodiment of a control system in accordance with the present invention.

The vehicle 100 also includes a control system 200 for controlling the torque output from one or more of the torque generators. An embodiment of the control system 200 in accordance with the invention is shown in FIG. 2.

The control system 200 includes a first controller 210 configured to identify the terrain or surface type and a second controller 220 configured to control one or more of the torque generators. In an embodiment of the invention, the first controller 210 is a terrain response system and the second controller 220 may be an electric powertrain controller. In other embodiments, the control system 200 may include a single controller or more than two controllers.

Terrain Identification

The control system 200 is configured to receive one or more input signals, for example electronic signals, from one or more of the sensors, subsystems or HMI devices 150 of the vehicle 100.

As described in further detail below, one or more of the input signals provide, or are used to calculate, surface indicators that are indicative of the surface on which the vehicle 100 is travelling or will be travelling on. The surface indicators include information relating to one or more characteristics of the surface or information that can be used to identify the surface type. This may include information relating to at least one of a coefficient of friction, a surface drag, a terrain roughness, wheel slip, a longitudinal acceleration, a lateral acceleration, a steering input or an ambient temperature.

With reference to FIG. 2, the first controller 210 includes a processing module 212 configured to process the input signals and determine the surface indicators. For example, the first controller 210 may receive input signals from various sensors and the processing module 212 may be configured to determine a vehicle speed and/or a wheel acceleration from the wheel speed sensors, the longitudinal force on the wheels 106, 108, 116, 118 from the vehicle longitudinal acceleration sensor, and/or the torque at which wheel slip occurs (if wheel slip occurs) from the motion sensors that detect yaw, pitch and roll. Other calculations may determine the wheel inertia torque (the torque associated with accelerating or decelerating the rotating wheels 106, 108, 116, 118), "continuity of progress" (the assessment of whether the vehicle 100 is starting and stopping, for example as may be the case when the vehicle 100 is travelling over rocky terrain), aerodynamic drag, yaw rate, and lateral vehicle acceleration.

Further calculations may determine a surface rolling resistance (based on the wheel inertia torque, the longitudinal force on the vehicle 100, aerodynamic drag, and the longitudinal force on the wheels 106, 108, 116, 118), the steering force on the steering wheel (based on the lateral acceleration and the output from the steering wheel sensor), the wheel longitudinal slip (based on the longitudinal force on the wheels 106, 108, 116, 118, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative, of a washboard type surface).

The SCS activity itself may be determined from several input signals received from an SCS ECU (not shown), which contains the DSC function, the TC (Traction Control) function, ABS and HDC algorithms, indicating DSC activity, TC activity, ABS activity, brake interventions on individual wheels 106, 108, 116, 118, and electric motor torque reduction requests from the SCS ECU to the electric motors. All these signals indicate a slip event has occurred and indicate the SCS activity that has acted to control it.

The processing module 212 may, for example, process the input signals from the wheel speed sensors to determine a wheel speed variation and corrugation detection signal. The processing module 212 may, for example, also calculate how long the windscreen wipers have been in an ON state (i.e. a rain duration signal) based on the windscreen wiper signal (ON/OFF) or calculate a terrain roughness based on the air suspension sensors (the ride height sensors) and the wheel accelerometers.

The estimates for the wheel longitudinal slip and the lateral friction estimation may also be compared with one another within the processing module 212 as a plausibility check.

The calculations described above provide a non-exhaustive list of surface indicators that may be determined by the control system 200. In other embodiments, the determination of additional and/or alternative surface indicators are envisaged and only a selection of the surface indicators described may be determined.

For example, calculations of the wheel speed variation and corrugation output, the surface rolling resistance estimation, the wheel longitudinal slip and the corrugation detection, together with the friction plausibility check, may provide sufficient surface indicators to indicate the nature of the surface on which the vehicle 100 is travelling.

Based on one or more of the surface indicators, the control system 200 is configured to select the surface type that best represents the terrain on which the vehicle 100 is travelling or will be travelling on, from a plurality of predetermined surface types. The predetermined surface types may include grassy, gravel, snowy, rocky, muddy, rutted, sandy and regular tarmac surface types. Many other predetermined surface types are also envisaged.

The predetermined surface types may also be grouped according to the characteristics of the surfaces. For example, it may be appropriate to group grass, gravel and snowy surfaces together as a general surface type that provides a low friction, smooth surface.

The predetermined surface types may be stored in a memory storage module of the control system 200. With reference to FIG. 2, the first controller 210 comprises a memory storage module 214 comprising each of the predetermined surface types and information relating to one or more characteristics associated with the predetermined surface types.

The control system 200 selects the most appropriate surface type from the plurality of predetermined surface types. This selection may be completed using a number of possible algorithms and/or processes in which the one or more surface indicators are compared to the characteristics associated with each of the predetermined surface types.

In one example, the control system 200 may be configured to compare each surface indicator with a corresponding condition associated with each of the predetermined surface types. The conditions for each predetermined surface type may include boundary values for each surface characteristic associated with said surface type. The memory storage module 214 may include a look-up table comprising each of the predetermined surface types and a plurality of conditions that are associated with each surface type.

More specifically, the processing module 212 may receive a surface indicator comprising a coefficient of friction and compare the coefficient of friction with an upper and a lower coefficient of friction value associated with each of the predetermined surface types. The comparison may reveal that the estimated coefficient of friction is between the upper and lower coefficient of friction values associated with one of the predetermined surface types, such as the gravel surface, and the processing module 212 will identify the terrain by selecting the surface type as the gravel surface.

Alternatively and/or additionally, the control system 200 may receive one of the input signals from the HMI device and the input signal may include a surface indicator comprising information relating to a surface type selection from a user. In this case, the control system 200 may select the predetermined surface type that corresponds to the surface type selected by the user.

In another example, the most appropriate surface type may be determined by analysing the probability of each of the predetermined surface types on the basis of the one or more surface indicators.

This approach is discussed in detail below and the selection of the most appropriate surface type may be achieved by means of a three phase process:

In phase (1), the processing module 212 may be provided with a probability algorithm for calculating the most suitable surface type based on the one or more surface indicators.

The algorithm may perform a probability calculation, based on the surface indicators, to determine which of the predetermined surface types best represents the surface on which the vehicle 100 is travelling.

The processing module 212 may, for example, include a tuneable data map which relates the one or more surface indicators (e.g. vehicle speed, road roughness, steering angle) to a probability that a particular predetermined surface type is appropriate.

Each probability value typically takes a value of between 0 and 1. So, for example, the vehicle speed calculation may return a probability of 0.7 for the rocky surface type if the vehicle speed is relatively slow, whereas if the vehicle speed is relatively high the probability for the rocky surface type will be much lower (e.g. 0.2). This is because it is much less likely that a high vehicle speed is indicative that the vehicle 100 is travelling over a rocky or boulder-filled terrain.

A combined probability value, Pb, is calculated for each of the predetermined surface types based on a combination of the individual probabilities for each surface indicator. In the following equation, for each of the predetermined surface types, the individual probability determined for each surface indicator is represented by a, b, c, d . . . n. The combined probability value, Pb, for each of the predetermined surface types is then calculated as follows:

$$Pb=(a \cdot b \cdot c \cdot d \ldots n)/((a \cdot b \cdot c \cdot d \ldots n)+(1-a) \cdot (1-b) \cdot (1-c) \cdot (1-d) \ldots (1-n))$$

Any number of individual probabilities may be input to the probability algorithm and any one probability value input to the probability algorithm may itself be the output of a combinational probability function.

Once the combined probability value for each of the predetermined surface types has been calculated, the predetermined surface type with the highest probability is selected by the processing module 212.

The benefit of using a combined probability function based on multiple surface indicators is that surface indicators may make a surface type (e.g. a grass surface or a muddy surface) more or less likely when combined together, compared with basing the selection on just a single surface indicator alone.

In phase (2), the processing module 212 may implement an integration process to determine whether it is necessary to change from the selected surface type to one of the alternative predetermined surface types.

The first step of the integration process is to determine whether there is a positive difference between the combined probability value for each of the alternative predetermined surface types compared with the combined probability value for the selected surface type.

By way of example, assume the selected surface type is a grass surface with a combined probability value of 0.5. If a combined probability value for the sandy surface is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the processing module 212 determines that the selected surface type (in this example, the grass surface type) is to be updated to a new, alternative surface type (in this example, the sandy surface type).

In phase (3), the processing module 212 may monitor the probability difference and if, at any point during the integration process, the probability difference changes from a positive value to a negative value, the processing module 212 may cancel the integration process and reset it to zero. Similarly, if the integrated value for one of the other alternative predetermined surface types (i.e. other than the sandy surface), reaches the predetermined change threshold before the probability result for the sandy surface type, the integration process for the sandy surface type may be cancelled and reset to zero and the predetermined surface type with a higher probability difference may be selected.

In any case, the control system 200 is able to select a surface type that is deemed most representative of the terrain and the selected surface may, for example, be communicated to the second controller 220 to inform the deceleration control.

Deceleration Control

Advantageously, the control system 200 is further configured to adapt the operation of the torque generators to account for the limitations of the selected surface and to provide optimal drivability, during a deceleration demand, whilst conserving the stability of the vehicle 100. More specifically, the control system 200 is configured to determine a target vehicle deceleration to produce in the absence of a positive torque demand, i.e. when there is a freewheel event, in dependence on the selected surface type.

The target vehicle deceleration is an optimal rate of deceleration for the selected surface type. The target vehicle deceleration may provide a comparable level of deceleration to that which is provided by engine braking during overrun in a conventional ICE vehicle, for example when the vehicle 100 is travelling on a normal road surface of zero gradient.

With reference to FIG. 2, the deceleration of the vehicle 100 during a deceleration demand is controlled by the second controller 220, which is configured to receive the selected terrain type and determine the target vehicle deceleration by means of a second processing module 222.

The target vehicle deceleration may, for example, set a negative torque produced by the torque generators.

The negative torque comprises a regenerative braking torque from the first and second electric motors 102, 104 and, if necessary, additional torque from the brakes 140, 142, 144, 146.

The target vehicle deceleration varies according to the selected surface type. However, the control system 200 may determine the target vehicle deceleration in a number of foreseeable ways.

For example, the control system 200 may be configured to determine the target vehicle deceleration by selecting a predetermined deceleration that is associated with the selected surface type. The control system 200 may store one or more predetermined decelerations that are associated with each of the predetermined surface types in a memory storage module.

In FIG. 2, the predetermined decelerations may be stored in the memory storage module 214 of the first controller 210 or stored in a further memory storage module 224 in the second controller 220. The predetermined decelerations may, for example, be stored in a look-up table comprising each of the predetermined surface types, as shown below.

| Surface Type | Target Deceleration ('g' or 'm/s2') |
| --- | --- |
| Road | a |
| Grass, gravel or snow (GGS) | b |
| Sand | c |
| Mud | d |

To provide a brief example, the first controller 210 may receive one or more of the surface indicators from the sensors, subsystems or HMI devices 150; select the most suitable surface type on the basis of the surface indicators; and communicate the selected surface type to the second controller 220. The second controller 220 may receive the selected surface type and determine the target vehicle deceleration by selecting the predetermined deceleration that is associated with the selected surface type.

In another example, the target vehicle deceleration may be determined based on one or more other factors in addition to the selected surface type.

For example, the control system 200 may be configured to receive one or more signals each comprising one or more vehicle condition indicators that are indicative of the motion and status of the vehicle 100. The vehicle condition indicators may include information relating to at least one of a vehicle speed, a coefficient of friction, a surface drag, and a gradient of the surface. The control system 200 may determine the target deceleration based on the selected surface type and the one or more signals.

The one or more signals may be generated by one or more of the sensors, subsystems or HMI devices 150, and the vehicle condition indicators may be determined in a similar manner to the surface indicators described previously.

For example, the one or more signals and the selected surface type may be received at the second controller 220, as shown in FIG. 2, and the second controller 220 may determine a corresponding target vehicle deceleration based thereon.

The control system 200 may, for example, determine the target vehicle deceleration by selecting the predetermined deceleration that is associated with the selected surface type and increasing or decreasing the predetermined deceleration based on the one or more vehicle condition indicators.

To give a specific example, the control system 200 may select a predetermined deceleration corresponding to a gravel surface and determine a reduced target vehicle deceleration based on a vehicle condition indicator that indicates a negative measurement of the gradient of the surface.

In another example, the control system 200 may, for example, select one of a plurality of predetermined decelerations that are associated with the selected surface type based on the one or more vehicle condition indicators.

In an example, the vehicle condition indicator may comprise a user preference received from the HMI device. The user preference may, for example, indicate whether the driver prefers gentle or harsh decelerations and the control system 200 may account for the preference in determining the target vehicle deceleration.

For example, the target vehicle deceleration may be selected from the plurality of predetermined decelerations associated with the selected surface type based on the user preference. Alternatively, a predetermined deceleration may be selected based on the selected surface type and increased or decreased based on the user preference.

In another example, the second controller 220 may, for example, include a tuneable data map which relates one or more of the driving condition indicators (e.g. vehicle speed, gradient, steering angle) to a target vehicle deceleration for each of the predetermined surface types. The second controller 220 may, for example, be configured to determine the target vehicle deceleration based on the data map, which is described in more detail in relation to FIGS. 3 and 4.

In any case, the control system 200 is configured to determine the target vehicle deceleration and to output the control signal to one or more of the torque generators during a deceleration demand, i.e. when there is no positive torque demand, so as to cause the torque generator to provide the target vehicle deceleration.

To make this possible, the control system 200 is configured to receive a further signal indicative of a deceleration demand. The further signal may provide, or be used to determine, an indication as to whether a deceleration demand exists and/or a quantitative estimate of the deceleration demand. The further signal may be generated by one or more of the sensors, subsystems or HMI devices 150, as described previously.

For example, the control system 200 may receive a signal from the accelerator pedal position sensor, which indicates the accelerator pedal position. The signal may be indicative of a deceleration demand when the accelerator pedal position is less than a threshold amount or at a position of zero travel or depression. In another example, the deceleration demand may be indicated by signals received from a collision avoidance system, a cruise control system 200, an electric powertrain control system 200 or a brakes 140, 142, 144, 146 system.

The signal which is indicative of the deceleration demand may, for example be received at the second controller 220.

The control system 200 is configured to output a control signal to one or more of the torque generators once the control system 200 has received a signal which indicates the deceleration demand. For example, the control system 200 may receive a deceleration demand and automatically output a control signal to one or more of the torque generators so as to cause the torque generators to provide the target vehicle deceleration.

The control signal may, for example, operate one or more of the torque generators to produce negative torque that decelerates the vehicle 100 according to the target vehicle deceleration.

In an example, the control signal may be stored in a memory storage module of the control system 200, for example the memory storage module 224 of the second controller 220, until the control system 200 receives a signal which indicates the deceleration demand or until the target vehicle deceleration changes.

In another example, the second controller 220 may receive the signal indicative of a deceleration demand and the processing module 222 may include a closed loop control system 200 configured to ensure that the output control signal operates one or more of the torque generators to provide the target vehicle deceleration.

In another example, the torque generators may be provided with their own intermediate controllers (not shown). During a deceleration demand, the intermediate controllers may be configured to receive the control signal comprising the target vehicle deceleration and to operate the respective torque generators to generate negative torque, for example regenerative braking torque, and cause the vehicle 100 to decelerate at the target vehicle deceleration.

Figure 3:
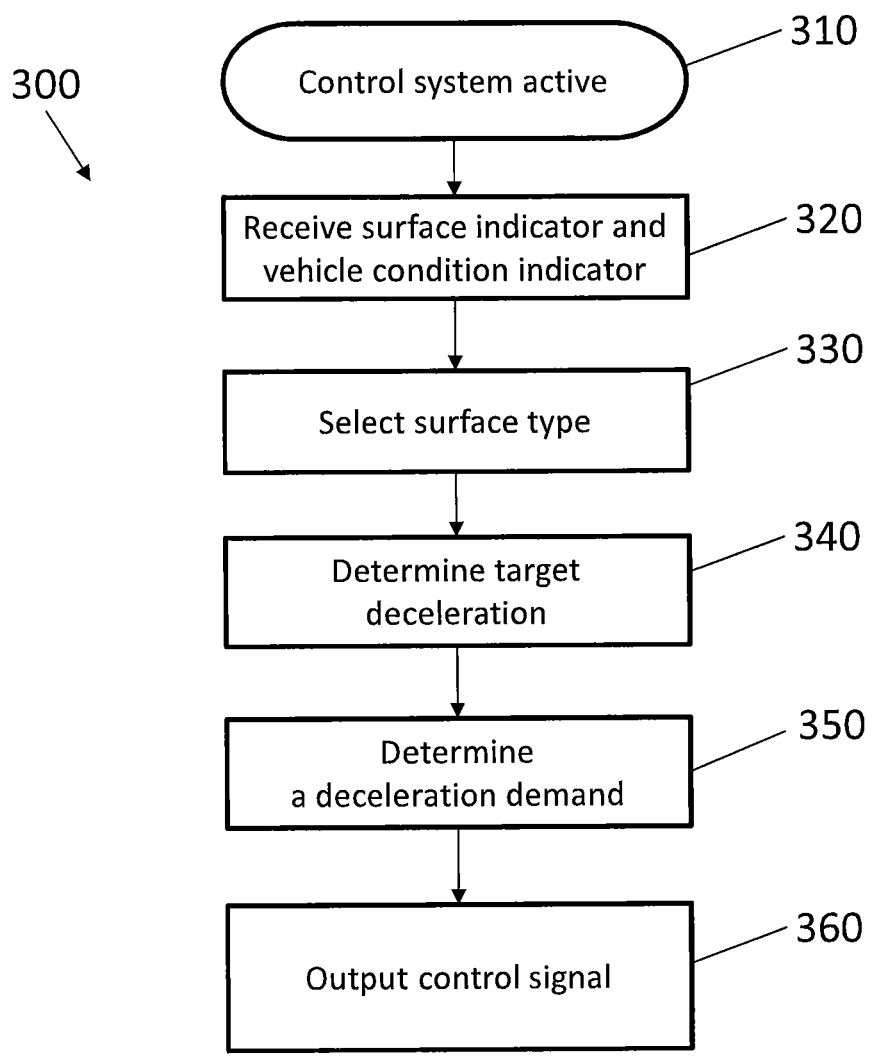
FIG. 3 illustrates an embodiment of a method of operating the control system, shown in FIG. 2, in accordance with the present invention.

FIG. 3 illustrates a control method 300 for operating the control system 200 in accordance with an embodiment of the invention.

The control method 300 is arranged to control one or more of the torque generators based on a type of surface in the vicinity of the vehicle 100.

In step 310, the control system 200 is operational and the sensors, subsystems and HMI devices 150 are configured to monitor the terrain and the motion and status of the vehicle 100. The vehicle 100 may, for example, be travelling along a path at a constant vehicle speed.

In step 320, the control system 200 receives one or more signals from the sensors, subsystems and HMI devices 150. The control system 200 processes the input signals to determine one or more surface indicators and driving condition indicators, for example as described in relation to FIG. 2.

In step 330, the control system 200 selects a surface type from the plurality of predetermined surface types. The control system 200 may select the surface type that best represents the terrain on which the vehicle 100 is travelling. For example, the first controller 210 may select the surface type by analysing the probability of each of the predetermined surface types on the basis of the one or more surface indicators, as described previously.

In step 340, the control system 200 determines the target vehicle deceleration based on the selected surface type. In an example, the second controller 220 may receive the selected surface type and determine the target vehicle deceleration using the tuneable data map described previously. For example, the second controller 220 may receive one or more of the driving condition indicators (e.g. a vehicle speed) and identify a target vehicle deceleration on the data map that corresponds to the driving condition indicators in combination with the selected surface type. This process is described in more detail in relation to FIG. 4.

In step 350, the control system 200 has determined the target vehicle deceleration and is ready to output a control signal to the torque generators in dependence on receiving a further signal indicative of a deceleration demand.

If the control system 200 receives a signal indicative of the deceleration demand, for example a signal from the accelerator pedal position sensors that indicates that there is no positive torque demand, then, in step 360, the control system 200 outputs a control signal to one or more of the torque generators so as to cause the torque generators to provide the target vehicle deceleration. The control signal may, for example, operate the first and second electric motors 102, 104 to produce a regenerative braking torque corresponding to the target vehicle deceleration.

The control system 200 may continually or periodically receive further surface indicators and vehicle condition indicators, in step 320, and proceed to determine whether the surface type or the target vehicle deceleration has changed, in steps 330 and 340. For example, the control system 200 may complete the integration process, described previously, to determine whether it is necessary to change from the selected surface type to one of the alternative predetermined surface types and the target vehicle deceleration may be recalculated by reference to the data map. If a new target vehicle deceleration is determined, then the control system 200 may be configured to prevent a step change in deceleration. For example, the control system 200 may be configured to implement a gradual change from the previously determined target vehicle deceleration to the newly determined target vehicle deceleration. The control system 200 may vary the output control signal over the course of a predetermined period of time to adjust the deceleration. For example, the control system 200 may increase/decrease the target vehicle deceleration by interpolating between the previous target and the new target, or by adjusting the deceleration at a predetermined rate until the newly determined target vehicle deceleration is reached.

In this manner, the selected surface type can be continuously or periodically updated based on the surface indicators and the target vehicle deceleration may be varied in dependence on the vehicle condition indicators, such as the vehicle speed and the gradient. This should ensure that the control system 200 identifies a surface type that best represents the terrain on which the vehicle 100 is travelling and that the vehicle 100 is configured to decelerate at a suitable rate, accounting for the terrain, when a deceleration demand exists.

For the sake of clarity, it should be appreciated that the control method 300 is merely provided by way of example only and is not intended to limit the control method 300 and/or the control system 200. As such, it is understood that any of the steps may be altered, reordered, added, removed or performed sequentially and/or in parallel with any other steps.

Figure 4:
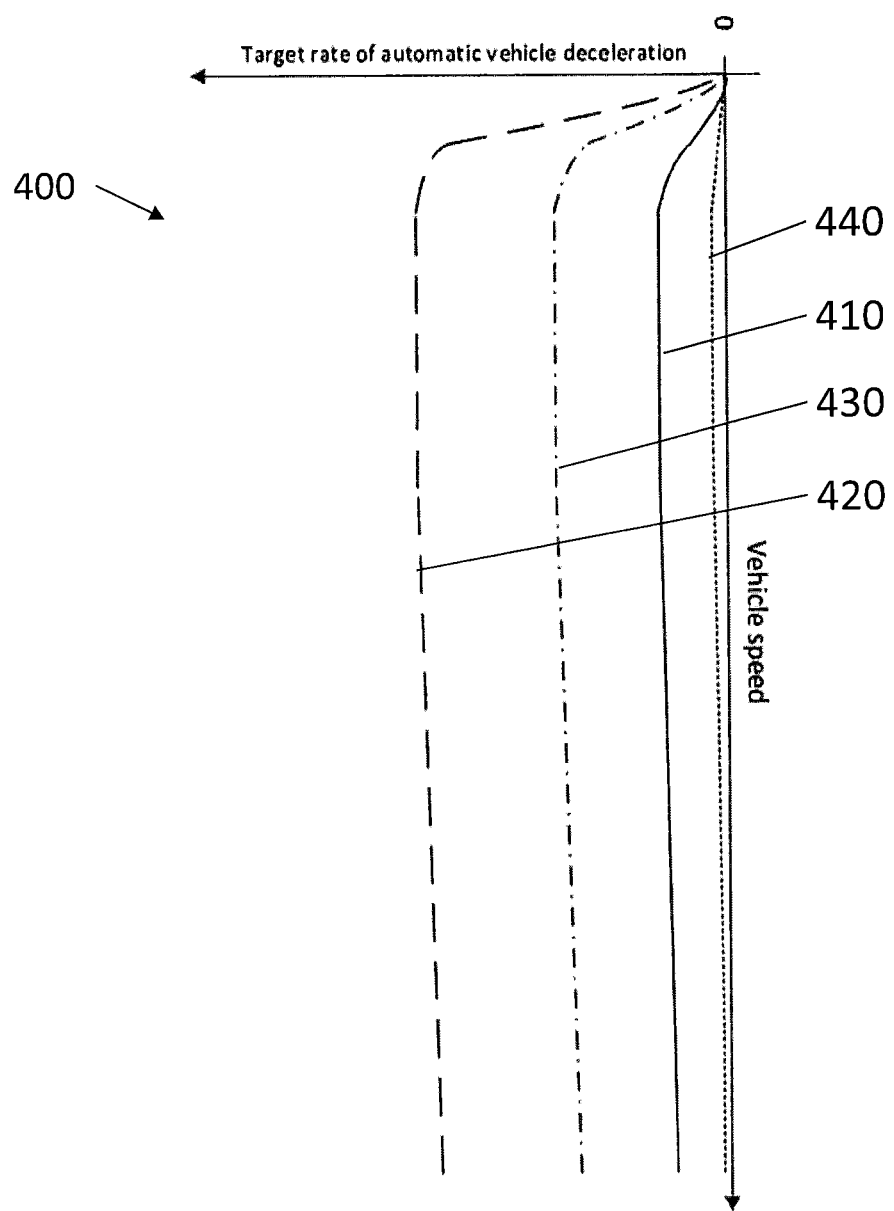
FIG. 4 illustrates an example of a data map for use with the control system, shown in FIG. 2.

FIG. 4 illustrates a tuneable data map 400 that may be stored on the control system 200 and used to determine the target vehicle deceleration based on the driving condition indicators and the selected surface type.

In this example, the driving condition indicators include the vehicle speed and a user preference that indicates whether the driver prefers normal or harsh decelerations during a deceleration demand.

The data map 400 shows a first plot 410 which illustrates the relationship between the vehicle speed and the target vehicle deceleration when the selected surface type is a regular tarmac road and the user preference indicates that the driver prefers normal decelerations during a deceleration demand.

The data map also shows a second plot 420 which illustrates the relationship between the vehicle speed and the target vehicle deceleration when the selected surface type is a regular tarmac road and the user preference indicates that the driver prefers harsh decelerations during a deceleration demand. In this case, the target vehicle deceleration is significantly greater across the range of vehicle speeds compared to when the user preference indicates that the driver prefers normal decelerations during a deceleration demand.

The data map also includes a third plot 430 which illustrates the relationship between the vehicle speed and the target vehicle deceleration when the selected surface type is a low friction surface, such as a grass, gravel or snow surface type and the user preference indicates that the driver prefers harsh decelerations during a deceleration demand. In this case, the target vehicle deceleration is significantly less across the range of vehicle speeds compared to the second plot 420, because the control system 200 has determined that the vehicle 100 is travelling on a muddy surface with low friction and infers that excessive deceleration would cause the vehicle 100 to lose traction.

The data map also includes a fourth plot 440 which illustrates the relationship between the vehicle speed and the target vehicle deceleration when the selected surface type is a high drag surface. In this case, the target vehicle deceleration is significantly less than the first, second and third plots 410, 420, 430, across the range of vehicle speeds. This is because the high drag surface acts to decelerate the vehicle 100 much faster than the regular tarmac and low friction surfaces. Hence, the target vehicle deceleration is reduced to avoid harsh decelerations that may be uncomfortable for the passengers.

Many modifications may be made to the above examples without departing from the scope of the present invention as defined in the accompanying claims.

The invention claimed is:

1. A control system for controlling a torque generator of a vehicle, the control system comprising one or more controllers individually or collectively configured to:
   receive one or more electrical signals indicative of a surface indicator;
   receive one or more electrical signals indicative of a deceleration demand;
   select a surface type from a plurality of predetermined surface types based on the one or more electrical signals indicative of the surface indicator;
   determine a target vehicle deceleration in dependence on the selected surface type, wherein the target deceleration is determined based on a predetermined deceleration associated with the selected surface type;
   determine, based on the one or more electrical signals indicative of the deceleration demand, a requirement to decelerate the vehicle; and
   in dependence on determining the requirement to decelerate the vehicle, output a control signal to the torque generator, wherein the control signal is configured to cause the torque generator to provide the target vehicle deceleration, wherein, in the case that the selected surface type is a relatively high drag surface, the target vehicle deceleration is reduced compared with when the selected surface type is a relatively low drag surface.

2. The control system according to claim 1, wherein the one or more controllers are communicatively connected to the torque generator such that the control signal may be output from the one or more controllers to the torque generator.

3. The control system of claim 1,
   wherein the one or more controllers comprise at least one electronic processor and at least one electronic memory device electrically coupled to the at least one electronic processor, wherein the at least one electronic memory device comprises instructions stored therein that, when executed by the at least one electronic processor, cause the at least one electronic processor to:
   select the surface type;
   determine the target vehicle deceleration;
   determine the requirement to decelerate the vehicle; and
   generate the control signal.

4. The control system according to claim 1, wherein the torque generator comprises a drive torque generator.

5. The control system according to claim 4, wherein the drive torque generator is an electric motor and the control signal to the torque generator causes the drive torque generator to provide a regenerative braking torque.

6. The control system according to claim 4, wherein the torque generator includes a vehicle brake.

7. The control system according to claim 1, wherein the deceleration demand is an overrun demand.

8. The control system according to claim 1, wherein the one or more electrical signals indicative of the surface indicator are indicative of the type of surface on which the vehicle is travelling or will be travelling on.

9. The control system according to claim 1, wherein the one or more electrical signals indicative of the surface indicator are generated by a user input.

10. The control system according to claim 1, wherein the one or more electrical signals indicative of the surface indicator comprise information relating to at least one of:
a coefficient of friction;
a surface drag;
a terrain roughness;
wheel slip;
a longitudinal acceleration;
a lateral acceleration;
a steering input; and
an ambient temperature.

11. The control system according to claim 10, further configured to select the surface type by comparing the information with a corresponding condition associated with each predetermined surface type.

12. The control system according to claim 1, further configured to receive at least one further electrical signal indicative of at least one of:
a vehicle speed;
a user preference;
a coefficient of friction;
a surface drag; and
a gradient of the surface;
wherein the control system is further configured to determine the target deceleration based on the at least one further electrical signal.

13. The control system according to claim 1, wherein the predetermined deceleration is included on a data map.

14. The control system according to claim 1, further configured to determine the target vehicle deceleration prior to determining the requirement to decelerate the vehicle.

15. A method of controlling a torque generator of a vehicle, wherein the method is carried out by one or more controllers individually or collectively, the method comprising:
receiving one or more electrical signals indicative of a surface indicator;
selecting a surface type from a plurality of predetermined surface types based on the one or more electrical signals indicative of the surface indicator;
determining a target deceleration based on the selected surface type, wherein the target deceleration is determined based on a predetermined deceleration associated with the selected surface type;
receiving one or more electrical signal indicative of a deceleration demand;
determining, based on the one or more electrical signals indicative of the deceleration demand, a requirement to decelerate the vehicle; and
outputting a torque control signal to the torque generator in dependence on determining the requirement to decelerate the vehicle, wherein the torque control signal is configured to cause the torque generator to generate the target deceleration, wherein, in the case that the selected surface type is a relatively high drag surface, the target deceleration is reduced compared with when the selected surface type is a relatively low drag surface.

16. A computer program product comprising a non-transitory computer readable storage medium having encoded thereon instructions that, when executed on a processor, cause the processor to perform operations comprising:
receiving one or more electrical signals indicative of a surface indicator;
selecting a surface type from a plurality of predetermined surface types based on the one or more electrical signals indicative of the surface indicator;
determining a target deceleration based on the selected surface type, wherein the target deceleration is determined based on a predetermined deceleration associated with the selected surface type;
receiving one or more electrical signal indicative of a deceleration demand;
determining, based on the one or more electrical signals indicative of the deceleration demand, a requirement to decelerate the vehicle; and
outputting a torque control signal to the torque generator in dependence on determining the requirement to decelerate the vehicle, wherein the torque control signal is configured to cause the torque generator to generate the target deceleration, wherein, in the case that the selected surface type is a relatively high drag surface, the target deceleration is reduced compared with when the selected surface type is a relatively low drag surface.

17. A controller for controlling a torque generator of a vehicle, the controller comprising at least one electronic processor configured to:
receive one or more electrical signals indicative of a surface indicator;
receive one or more electrical signals indicative of a deceleration demand;
select a surface type, from a plurality of predetermined surface types, based on the one or more electrical signals indicative of the surface indicator;
determine a target vehicle deceleration in dependence on the selected surface type, wherein the target vehicle deceleration is determined based on a predetermined deceleration associated with the selected surface type;
determine, based on the one or more electrical signals indicative of the deceleration demand, a requirement to decelerate the vehicle; and
output a control signal to the torque generator in dependence on the requirement to decelerate the vehicle, wherein, in the case that the selected surface type is a relatively high drag surface, the target vehicle deceleration is reduced compared with when the selected surface type is a relatively low drag surface.

18. A vehicle comprising the control system of claim 1.

* * * * *